(12) United States Patent
Hu et al.

(10) Patent No.: US 11,106,121 B2
(45) Date of Patent: Aug. 31, 2021

(54) LASER LIGHT SOURCE INCORPORATING AN ANGULAR DISTRIBUTION CONTROL ELEMENT, AND RELATED WAVELENGTH CONVERSION LIGHT SOURCE, LIGHT COMBINING LIGHT SOURCE, AND PROJECTION SYSTEM

(71) Applicant: APPOTRONICS CHINA CORPORATION, Shenzhen (CN)

(72) Inventors: Fei Hu, Shenzhen (CN); Haixiong Hou, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/703,530

(22) Filed: Sep. 13, 2017

(65) Prior Publication Data

US 2018/0011394 A1 Jan. 11, 2018

Related U.S. Application Data

(63) Continuation of application No. 14/890,899, filed as application No. PCT/CN2014/076946 on May 7, 2014, now Pat. No. 9,778,554.

(30) Foreign Application Priority Data

May 13, 2013 (CN) .......................... 201310174987.4

(51) Int. Cl.
*G03B 21/20* (2006.01)
*G02B 27/09* (2006.01)
*H01S 3/00* (2006.01)

(52) U.S. Cl.
CPC ....... *G03B 21/208* (2013.01); *G02B 27/0994* (2013.01); *G03B 21/204* (2013.01);
(Continued)

(58) Field of Classification Search
CPC .............. G03B 21/2033; G03B 21/208; G03B 21/204; G03B 21/2013; G02B 27/0994; H01S 3/005
See application file for complete search history.

(56) References Cited

U.S. PATENT DOCUMENTS 5,365,374 A * 11/1994 Nishikawa ......... B23K 26/0604
359/619
5,477,384 A * 12/1995 Nishikawa ......... B23K 26/0604
359/619

(Continued)

FOREIGN PATENT DOCUMENTS

CN 2203785 Y 7/1995
CN 101118346 A 2/2008
(Continued)

OTHER PUBLICATIONS

Chinese Office Action, dated Oct. 28, 2014, and Search Report dated Oct. 16, 2014, in a counterpart Chinese patent application, No. CN 201310174987.4.

(Continued)

*Primary Examiner* — Bao-Luan Q Le
(74) *Attorney, Agent, or Firm* — Chen Yoshimura LLP

(57) ABSTRACT

A laser light source (300), a wavelength conversion light source, a light combining light source, and a projection system. The laser light source comprises a laser element array, a focusing optical element (33), a collimation optical element (34), an integrator rod (36) for receiving and homogenizing a secondary laser beam array (382), an angular distribution control element (35) disposed on the light path between the laser element array and the integrator rod (36) for enlarging the divergence angle of the laser beam array (382) in the direction of the short axis of the light distribution, such that the rate between the divergence angle of each of the secondary laser beam that enters the integrator (Continued)

rod (36) in the direction of the short axis of the light distribution and the divergence angle in the direction of the long axis is greater than or equal to 0.7.

15 Claims, 5 Drawing Sheets

(52) U.S. Cl.
CPC ..... *G03B 21/2013* (2013.01); *G03B 21/2033* (2013.01); *H01S 3/005* (2013.01); *H01S 3/0092* (2013.01)

(56) References Cited

U.S. PATENT DOCUMENTS

| | | | | |
|---|---|---|---|---|
| 6,497,488 | B1* | 12/2002 | Yamauchi | H04N 9/3105 353/38 |
| 7,101,050 | B2 | 9/2006 | Magarill | G02B 27/0927 348/E5.139 |
| 7,135,392 | B1* | 11/2006 | Adams | B23K 26/0604 438/513 |
| 7,213,921 | B2* | 5/2007 | Yang | G03B 21/2066 353/30 |
| 7,789,517 | B2* | 9/2010 | Lee | H04N 5/7458 353/94 |
| 7,943,893 | B2* | 5/2011 | Sawai | G03B 21/208 250/208.1 |
| 7,988,305 | B2* | 8/2011 | Itoh | G02B 27/0994 353/94 |
| 8,585,208 | B2* | 11/2013 | Akiyama | G03B 21/2013 353/31 |
| 8,651,671 | B2* | 2/2014 | Miyazaki | G03B 21/208 353/98 |
| 8,770,763 | B2* | 7/2014 | Murayama | G02B 27/48 353/38 |
| 8,858,037 | B2* | 10/2014 | Li | F21V 7/00 362/311.02 |
| 8,894,241 | B2* | 11/2014 | Kitano | H04N 9/3114 362/257 |
| 9,063,404 | B2* | 6/2015 | Okuda | H04N 9/3161 |
| 9,188,709 | B2* | 11/2015 | Itoh | G02B 3/0056 |
| 9,347,626 | B2* | 5/2016 | Kaneda | G03B 21/208 |
| 9,373,927 | B2* | 6/2016 | Ito | B29D 11/00019 |
| 9,377,675 | B2* | 6/2016 | Matsubara | G02B 27/102 |
| 9,482,877 | B2* | 11/2016 | Janssens | G02B 27/0927 |
| 9,810,977 | B2* | 11/2017 | Akiyama | H04N 9/3164 |
| 2005/0254019 | A1* | 11/2005 | Magarill | G03B 21/208 353/97 |
| 2006/0082735 | A1* | 4/2006 | Yang | G03B 21/2066 353/84 |
| 2006/0102605 | A1 | 5/2006 | Adams et al. | |
| 2006/0146297 | A1* | 7/2006 | Lee | H04N 5/7458 353/99 |
| 2006/0238720 | A1* | 10/2006 | Lee | G03B 21/2033 353/38 |
| 2006/0274278 | A1 | 12/2006 | Lee et al. | |
| 2007/0019912 | A1* | 1/2007 | Lutz | G02B 6/4204 385/43 |
| 2007/0127245 | A1* | 6/2007 | Magarill | G02B 27/0927 362/291 |
| 2007/0140616 | A1* | 6/2007 | Sugita | G02B 19/0052 385/32 |
| 2008/0025041 | A1 | 1/2008 | Lee et al. | |
| 2008/0278691 | A1 | 11/2008 | Willemsen et al. | |
| 2008/0278693 | A1* | 11/2008 | Sawai | G03B 21/208 353/38 |
| 2008/0031674 | A1 | 12/2008 | Egger | |
| 2009/0016061 | A1* | 1/2009 | Chen | G03B 21/2033 362/284 |
| 2009/0168041 | A1* | 7/2009 | Sawai | G02B 7/14 355/71 |
| 2010/0165307 | A1 | 7/2010 | Mizushima et al. | |
| 2010/0231862 | A1* | 9/2010 | Itoh | G03B 21/2033 353/31 |
| 2010/0271598 | A1* | 10/2010 | Murayama | G03B 21/208 353/38 |
| 2010/0271599 | A1* | 10/2010 | Miyazaki | G02B 27/48 353/38 |
| 2011/0234985 | A1* | 9/2011 | Ryf | H04N 9/3161 353/38 |
| 2012/0133904 | A1* | 5/2012 | Akiyama | G03B 33/06 353/38 |
| 2012/0162614 | A1* | 6/2012 | Kobayashi | H04N 9/3164 353/31 |
| 2012/0212929 | A1* | 8/2012 | Li | F21V 7/00 362/19 |
| 2012/0236212 | A1* | 9/2012 | Itoh | G02B 3/0068 348/744 |
| 2012/0236264 | A1* | 9/2012 | Akiyama | G03B 21/2066 353/37 |
| 2012/0249621 | A1 | 10/2012 | Miura | |
| 2013/0088471 | A1* | 4/2013 | Kitano | G03B 21/2073 345/208 |
| 2013/0162956 | A1* | 6/2013 | Okuda | G03B 21/2066 353/30 |
| 2013/0258215 | A1* | 10/2013 | Kaneda | G02B 27/48 349/5 |
| 2013/0301013 | A1* | 11/2013 | Samejima | G02B 19/0028 353/52 |
| 2014/0028985 | A1* | 1/2014 | Janssens | G02B 27/0955 353/31 |
| 2014/0139810 | A1* | 5/2014 | Matsubara | G03B 21/2013 353/31 |
| 2014/0300873 | A1* | 10/2014 | Miyamoto | G02B 27/48 353/102 |
| 2014/0348190 | A1* | 11/2014 | Ito | G01B 11/24 372/29.014 |
| 2015/0124225 | A1* | 5/2015 | Akiyama | G03B 21/208 353/31 |
| 2015/0323861 | A1* | 11/2015 | Saitou | G03B 21/204 353/31 |
| 2017/0343891 | A1* | 11/2017 | Sakata | G03B 21/206 |

FOREIGN PATENT DOCUMENTS

| | | |
|---|---|---|
| CN | 102147532 A | 8/2011 |
| CN | 102478754 A | 5/2012 |
| CN | 102566236 A | 7/2012 |
| CN | 102707553 A | 10/2012 |
| CN | 102722072 A | 10/2012 |
| EP | 1712940 A1 | 10/2006 |
| JP | 2008-34351 A | 2/2008 |
| JP | 2010-027492 A | 2/2010 |
| JP | 4723637 B2 | 7/2011 |
| KR | 10-2006-0125346 A | 12/2006 |
| WO | 2007072336 A1 | 6/2007 |
| WO | 103279005 A | 9/2013 |

OTHER PUBLICATIONS

Japanese Office Action, dated Sep. 13, 2016 in a counterpart Japanese patent application, No. JP 2016-513215.
Korean Office Action, dated Nov. 16, 2016 in a counterpart Korean patent application, No. KR 10-2015-7033729.
European Search Report in a counterpart application EP 14798594.9, dated Jul. 27, 2016.
Extended European Search Report in a counterpart application EP 14798594.9, dated Aug. 5, 2016.
International Search Report in the parent PCT Application No. PCT/CN2014/076946, dated Aug. 20, 2014.
IPRP in the parent PCT Application No. PCT/CN2014/076946, dated Nov. 17, 2015.

* cited by examiner

LASER LIGHT SOURCE INCORPORATING AN ANGULAR DISTRIBUTION CONTROL ELEMENT, AND RELATED WAVELENGTH CONVERSION LIGHT SOURCE, LIGHT COMBINING LIGHT SOURCE, AND PROJECTION SYSTEM

BACKGROUND OF THE INVENTION

Field of the Invention

This invention relates to illumination and display technologies, and in particular, it relates to a laser light source, a wavelength conversion light source, a light combining light source, and a projection system.

Description of Related Art

With the advance of semiconductor technologies, the advantages of solid state light sources are more and more evident. Laser light sources, as a high brightness and highly collimated new light source, are being more widely used in projection and illumination fields. Laser light sources have small etendue, and can provide high brightness output light, but also make it more difficult to homogenize the light.

FIG. 1 is a conventional laser light source that uses a square light rod to homogenize the light. Here, elements 11a-11c are laser diodes, elements 12a-12c are collimating lenses, element 13 is a converging lens, and element 14 is a square light rod. The collimating lenses 12a-12c are an array of spherical or aspherical lenses, where each lens corresponds to a laser diode. The laser light emitted by the laser diodes 11a-11c is first collimated by the collimating lenses 12a-12c into parallel light beams, and then converged by the converging lens 13 to a small light spot; the light spot has a size that matches the size of the light entrance port of the square light rod 14. The square light rod 14 is a hollow or solid light transmitting rod, to homogenize the input light beam. However, empirical observation reveals that the light homogenizing effect of this system is not satisfactory, and the light output from the output port of the light rod 14 still has separate laser light spots and does not form a uniform surface distribution. Extending the length of the light rod 14 to increase the number of times of reflections of the laser light inside the light rod does not significantly improve the light uniformity.

SUMMARY

An object of the present invention is to provide a laser light sources with improved uniformity of the output laser light beam.

An embodiment of the present invention provides a laser light source, which includes:

A laser light source array including a laser element array, for generating a collimated primary laser beam array;

A focusing optical element and a collimation optical element disposed sequentially after the laser light source array, wherein the collimated primary laser beam array sequentially passes through the focusing optical element and the collimation optical element to form a collimated secondary laser beam array, wherein a distance between secondary laser beams in the secondary laser beam array is smaller than a distance between primary laser beams in the primary laser beam array;

An integrator rod disposed after the collimation optical element, for receiving and homogenizing the secondary laser beam array; and An angular distribution control element disposed on an optical path between the laser element array and the integrator rod, for enlarging a divergence angle of the secondary laser beam array in a direction of a short axis of its light distribution, such that for each secondary laser beam of the secondary laser beam array that enters the integrator rod, a ratio of a divergence angle in a direction of a short axis of the light distribution to a divergence angle in a direction of a long axis is greater than or equal to 0.7.

Preferably, the angular distribution control element is a collimating lens array, each collimating lens corresponding to a laser element for collimating a light emitted by the laser element;

Wherein the laser element is located on an optical axis of the corresponding collimating lens and away from its focal point, and wherein for the primary laser beam output by the collimating lens, the ratio of the divergence angle in the direction of the short axis of the light distribution to the divergence angle in the direction of the long axis is greater than or equal to 0.7.

Preferably, the angular distribution control element is at least one cylindrical lens, disposed between the collimation optical element and the integrator rod, wherein each cylindrical lens corresponds to at least one column of the secondary laser beams of the secondary laser beam array outputted by the collimation optical element, wherein a column direction of each column of the at least one column of secondary laser beams is parallel to a generating line of the cylindrical lens, and wherein for each secondary light beam of each column of secondary light beams, its long axis of the light distribution is parallel to the generating line of the cylindrical lens;

Wherein for each secondary laser beam after its corresponding cylindrical lens, the ratio of the divergence angle in the direction of the short axis of the light distribution to the divergence angle in the direction of the long axis is greater than or equal to 0.7.

Preferably, the angular distribution control element is a scattering plate, disposed between the collimation optical element and the integrator rod, wherein for the secondary laser beam array after scattering by the scattering plate, the ratio of the divergence angle in the direction of the short axis of the light distribution to the divergence angle in the direction of the long axis is greater than or equal to 0.7.

Preferably, the angular distribution control element is a micro-lens array, disposed between the collimation optical element and the integrator rod, wherein each micro-lens in the micro-lens array is a rectangle;

Wherein a direction of a short axis of a light distribution of the secondary laser beam array incident on the micro-lens array is parallel to a long side of each micro-lens; and wherein for the secondary laser beam array outputted from the micro-lens array, the ratio of the divergence angle in the direction of the short axis of the light distribution to the divergence angle in the direction of the long axis is greater than or equal to 0.7.

Preferably, the laser light source array includes a laser element array and a collimating lens array, wherein each collimating lens corresponds to a laser element, for collimating the laser emitted by the laser element, and wherein each laser element is located on an optical axis of the corresponding collimating lens and away from its focal point;

Wherein the angular distribution control element is located between the collimation optical element and the integrator rod, for increasing the divergence angle in the direction of the short axis of light distribution of each incident secondary laser beam, or decreasing the divergence angle in the direction of the long axis of light distribution of each incident secondary laser beam, such that for each secondary laser beam of the secondary laser beam array incident on the integrator rod, the ratio of the divergence angle in the direction of the short axis of the light distribution to the divergence angle in the direction of the long axis is greater than or equal to 0.7.

Preferably, the integrator rod is a solid rod, and wherein the angular distribution control element and the integrator rod are formed integrally as one body.

Another embodiment of the present invention provides a laser light source, including:

A laser light source array, for generating a collimated primary laser beam array;

A focusing optical element and a collimation optical element disposed sequentially after the laser light source array, wherein the collimated primary laser beam array sequentially passes through the focusing optical element and the collimation optical element to form a collimated secondary laser beam array, wherein a distance between secondary laser beams in the secondary laser beam array is smaller than a distance between primary laser beams in the primary laser beam array;

An integrator rod disposed after the collimation optical element, for receiving and homogenizing the secondary laser beam array, wherein a light entrance port of the integrator rod is larger in size than a light exit port;

Wherein the light entrance port of the integrator rod has a first side and a second side perpendicular to each other, the light exit port has a first side and a second side perpendicular to each other, wherein the first side of the light entrance port and the first side of the light exit port are parallel to each other, and wherein a length ratio of the first side of the light entrance port to the first side of the light exit port is smaller than a length ratio of the second side of the light entrance port to the second side of the light exit port;

Wherein when the secondary laser beam array enters the integrator rod, the direction of the long axis of the light distribution of each secondary laser beam is parallel to the first side of the light entrance port of the integrator rod.

Preferably, the first side of the light entrance port of the integrator rod is equal in length to the first side of the light exit port.

Preferably, the light entrance port of the integrator rod is a square shape.

Preferably, an angular distribution control element is disposed on an optical path between the laser element array and the integrator rod, for shaping the secondary laser beam array, to increase the ratio of the divergence angle in the direction of the short axis of the light distribution to the divergence angle in the direction of the long axis for each secondary laser beam of the secondary laser beam array incident on the integrator rod.

Another embodiment of the present invention provides a wavelength conversion light source, including:

The above laser light source;

A wavelength conversion device, for receiving a light generated by the laser light source and emitting a converted light.

Another embodiment of the present invention provides a light combining light source, including:

The above laser light source;

A wavelength conversion light source, which includes an excitation light source and a wavelength conversion device, the wavelength conversion device receiving an excitation light generated by the excitation light source and emitting a converted light; and A light combining device, where a light emitted by the laser light source and the converted light emitted by the wavelength conversion light source are incident onto the light combining device from different directions and are combined by the light combining device into one output light beam.

Another embodiment of the present invention provides a projection system, including:

The above light combining light source;

A spatial light modulator device, for receiving the output light beam generated by the light combining light source and modulating it.

Compared to conventional technologies, embodiments of the present invention have the following advantages:

In embodiments of the present invention, the primary laser beam array passes through the focusing optical element and the collimation optical element and its cross-section is compressed to form the secondary laser beam array, where the divergence angles of the secondary laser beams are larger than the divergence angles of the primary laser beams. This way, the secondary laser beams can achieve a more uniform surface distribution after the downstream integrator rod. Meanwhile, an angular distribution control element is provided on the optical path between the laser element array and the integrator rod, to increase the divergence angle in the direction of the short axis of the light distribution of the laser beam array, such that for each secondary laser beam in the secondary laser beam array incident on the integrator rod, the ratio of the divergence angle in the direction of the short axis of the light distribution to the divergence angle in the direction of the long axis is greater than or equal to 0.7. This increases the number of times of reflection inside the integrator rod for the light beams of the secondary laser beam array in the direction of the short axis, so that the numbers of times of reflection inside the integrator rod for the light beams in the direction of the short axis and for the light beams in the direction of the long axis are closer to each other, which further increases the uniformity of the secondary laser beam after the integrator rod.

DETAILED DESCRIPTION OF PREFERRED EMBODIMENTS

Figure 1:
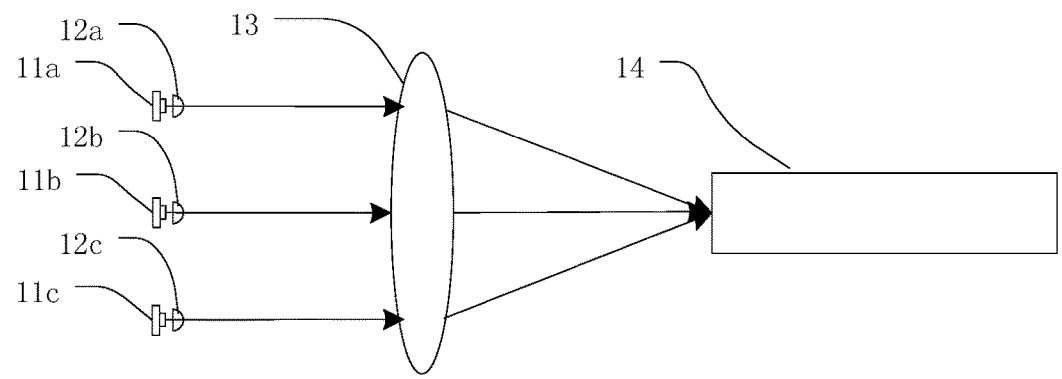
FIG. 1 illustrates a conventional laser light source which uses a square light rod for light homogenization.

The inventors of the present invention studied the problems of non-uniformity of the output light from the laser light source of FIG. 1, and discovered that, a key factor for a typical light beam to be homogenized by the light rod is that the angular distribution of the light beam is continuous. In such situations, after the light is reflected multiple times in the light rod, the surface distribution of the light is continuous; the more time the light is reflected, the better the uniformity of its surface distribution.

Figure 2:
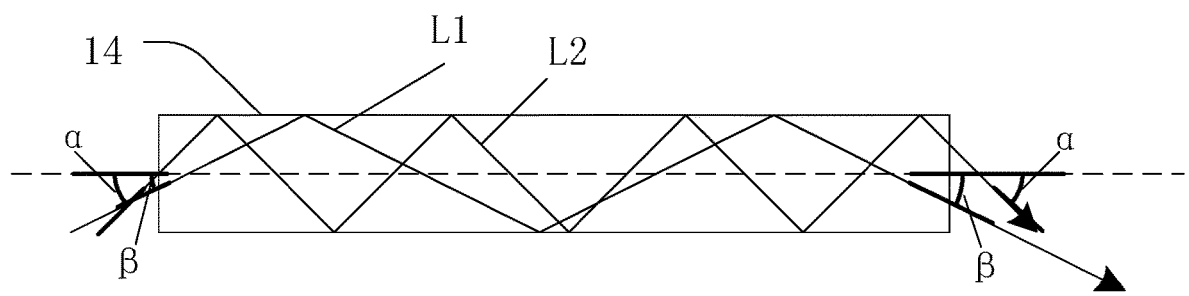
FIG. 2 illustrates a working principle of a square light rod in the conventional technology.

However, the laser beam that is converged by the converging lens 13 is different from a typical light beam in that it is formed of multiple laser beams, and each laser beam is generated by a laser diode and its corresponding collimating lens; as a result, the angular distribution of the overall light beam is not continuous, but is discrete. The propagation of these discrete laser beams in the light rod 14 is shown in FIG. 2. The laser beam L1 enters with an incident angle $\alpha$, and exits with an exit angle $\alpha$; the laser beam L2 enters with an incident angle $\beta$, and exits with an exit angle $\beta$. Because the divergence angle of each light beam is small, after multiple reflections inside the light rod, each of them remains a thin light beam, and as a result, at the exit port of the light rod, they cannot have a mixing effect to generate a uniform light distribution.

Embodiments of the present invention are described below with reference to the drawings.

First Embodiment

Figure 3A:
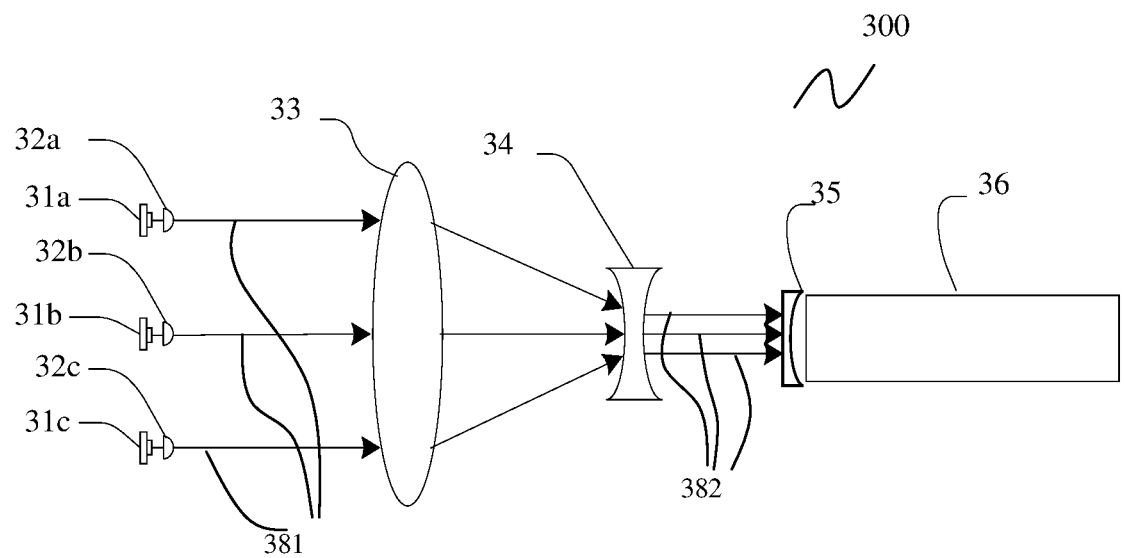
FIG. 3A schematically illustrates the structure of a laser light source according to an embodiment of the present invention.

FIG. 3A schematically illustrates the structure of a laser light source according to an embodiment of the present invention. The laser light source 300 includes a laser light source array, which generates an array of collimated primary laser beams 381. The laser light source array includes a laser element array and a collimating lens array. The laser element array includes laser elements 31a, 31b and 31c, and the collimating lens array includes collimating lenses 32a, 32b and 32c, where each collimating lens corresponds to a laser element. The light emitting location of the laser element is located at the focal point of the corresponding collimating lens, so the light emitted by the laser element is collimated by the collimating lens.

In this embodiment, the laser elements are laser diodes, or other elements that generate laser light, without limitation. Of course, the number of elements in the laser element array and the collimating lens array are only examples and do not limit the invention.

Figure 3B:
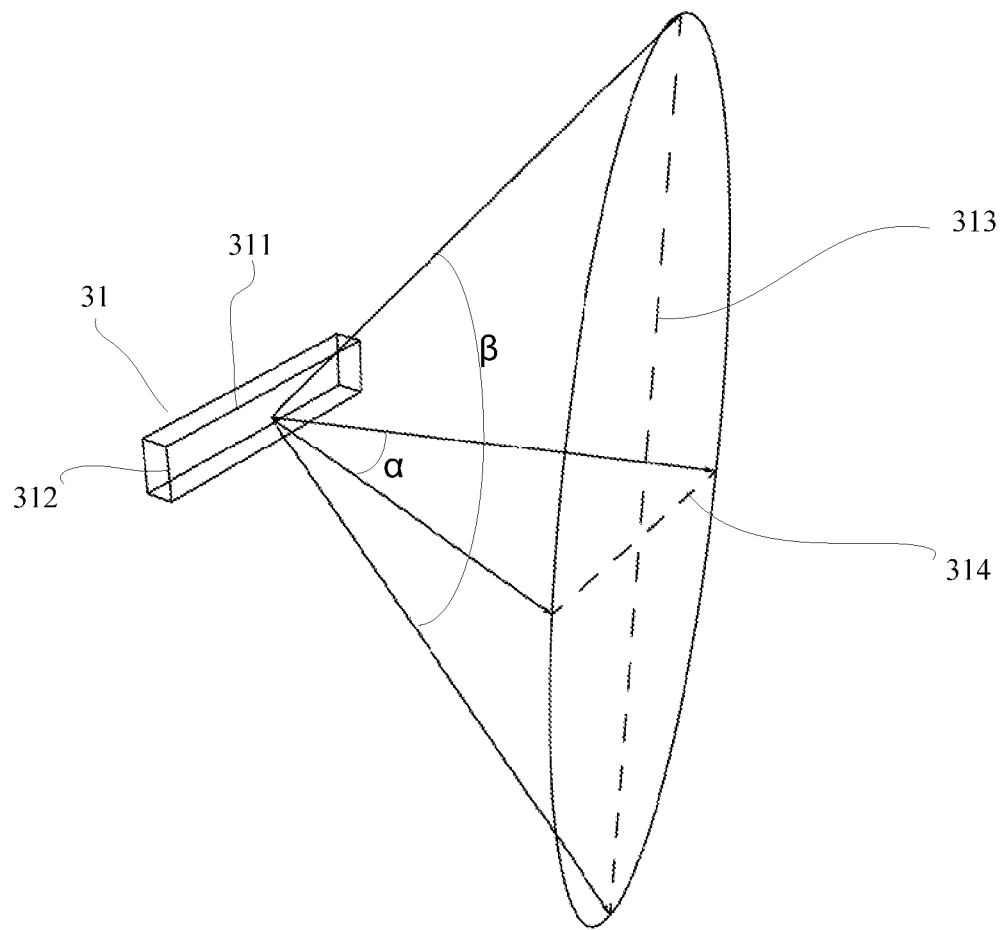
FIG. 3B schematically illustrates the light emitted by a laser element.

Refer to FIG. 3B, which schematically illustrates the light emitted by a laser element. The light emitting surface of the laser element 31 is a rectangular shape; the divergence angle of the light in a cross-section that is parallel to the long side 311 of the rectangle is $\alpha$, and the divergence angle of the light in a cross-section that is parallel to the short side 312 of the rectangle is $\beta$, where $\alpha$ is smaller than $\beta$. Typically, $\beta$ is greater than five times $\alpha$. I.e., the long axis 313 of the output light distribution of the laser element 31 is parallel to the short side 312 of the rectangle, and the short axis 314 of the output light distribution is parallel to the long side 311 of the rectangle.

Figure 3C:
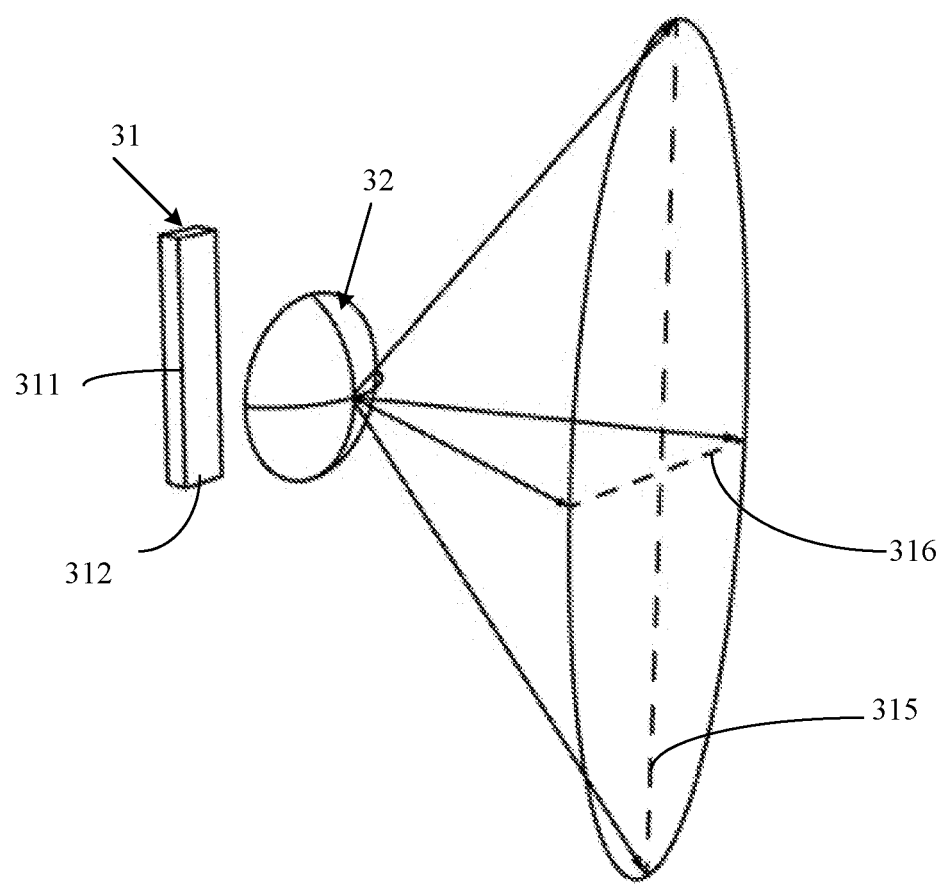
FIG. 3C schematically illustrates the light emitted by the laser element after a collimating lens.

The primary laser beam which is emitted by the laser element 31 and collimated by the collimating lens is not a strict parallel beam. Compared to the light emitted by the laser element, the collimated laser beam has a smaller divergence angle, but the collimated laser beam still has a long axis and a short axis in its light distribution. Refer to FIG. 3C, which schematically illustrates the light emitted by the laser element 31 after the collimating lens 32. It should be noted that the long axis 315 of the light distribution of the primary laser beam is parallel to the long side 311 of the light emitting surface of the laser element 31, and the short axis 316 of the light distribution of the primary laser beam is parallel to the short side 312 of the light emitting surface of the laser element 31; the ratio of the divergence angle in the direction of the long axis 315 to that in the direction of the short axis 316 is relatively large, typically greater than 5. For clarity, in the following descriptions, the "long axis direction" and "short axis direction" refer to the long axis direction and the short axis direction of the light distribution of the light beam.

This way, of the primary laser beam array 381 generated by the laser elements and collimated by the collimating lenses, the optical axes of the primary laser beams are parallel to each other, and each laser beam has a certain divergence angle, and the ratio of the divergence angle in the direction of the long axis of the light distribution to that in the direction of the short axis is still relatively large.

The laser light source 300 further includes a focusing optical element 33 and a collimation optical element 34 disposed sequentially after the laser light source array, where the primary laser beam array 381 sequentially passes through the focusing optical element 33 and the collimation optical element 34 to form a collimated secondary laser beam array 382.

In this embodiment, the focusing optical element is a convex lens 33 and the collimation optical element is a concave lens 34. The convex lens 33 and the concave lens 34 are confocal, where the focal point of the concave lens 34 is a virtual focal point, which is located on the optical path after the concave lens 34. This way, the primary laser beam array 381 is first focused by the convex lens 33 and converges toward its focal point, and the cross-sectional size of the beam incident on the concave lens 34 is smaller than the cross-sectional size of the beam incident on the convex lens 33. Because these laser beams are also converging toward the focal point of the concave lens, the light beams after the concave lens 34 are again parallel, forming the collimated secondary laser beam array 382; but the cross-sectional size of the laser beams is compressed, i.e., the distance between the secondary laser beams in the secondary laser beam array 382 is smaller than the distance between the primary laser beams in the primary laser beam array.

Based on the principle of the conservation of etendue, when the cross-sectional size of a light beam is compressed, its divergence angle will increase, i.e., $$S_1 * \sin^2\theta_1 = S_2 * \sin^2\theta_2 \tag{1}$$

where $S_1$, $\theta_1$ are respectively the cross-sectional size and divergence half-angle of the primary laser beam array, and $S_2$, $\theta_2$ are respectively the cross-sectional size and divergence half-angle of the secondary laser beam array. Here, $S_2 < S_1$, so $\theta_2$ is greater than $\theta_1$. It should be noted that in equation (1), the divergence half-angle is not the angle between the laser beams, but a half of the divergence angle of each laser beam itself.

In practice, by controlling the positions and curvatures of the convex lens 33 and the concave lens 34, the compression ratio of the cross-sectional size of the secondary laser beam array 382 to that of the primary laser beam array 381 can be controlled (the compression ratio of the light beams is approximately the ratio of the focal distances of the convex lens 33 and the concave lens 34). This in turn controls the rate of increase of the divergence half-angle of each laser beam in the secondary laser beam array relative to the divergence half-angle of each laser beam in the primary laser beam array. It should be understood that, for each laser beam in the secondary laser beam array, the rate of increase of the divergence angle in the direction of the long axis of light distribution is the same as that in the direction of the short axis, so the ratio of the divergence angles in the two directions are still relatively large.

The laser light source 300 further includes an angular distribution control element 35 disposed after the collimation optical element 34, for receiving the secondary laser beam array 382 and shaping it, so that for each secondary laser beam of the secondary laser beam array 382 after the shaping, the ratio of the divergence angle in the direction of the short axis of the light distribution to the divergence angle in the direction of the long axis is greater than or equal to 0.7.

Specifically, in this embodiment, the angular distribution control element 35 is a cylindrical lens. Because a cylindrical lens can only change the divergence angle of a light beam in one dimension, it can be used to increase the divergence angle of the laser beam in the direction of the short axis without changing the divergence angle in the direction of the long axis. The curvature of the cylindrical surface of the cylindrical lens can be designed to so that the ratio of the divergence angle for each laser beam in the direction of the short axis to the divergence angle in the direction of the long axis is greater than or equal to 0.7. To achieve the above goal, the long axis of the light distribution of each secondary laser beam of the secondary laser beam array that are incident on the cylindrical lens is parallel to the generating line of the cylindrical lens surface.

The laser light source 300 further includes an integrator rod 36 disposed after the angular distribution control element 35, for receiving and homogenizing the secondary laser beam array that has been shaped by the angular distribution control element 35.

Based on current understanding of integrator rods (the square light rod discussed in the background section and cone shaped light rods are both examples of integrator rods), the incident light should enter the integrator rods with a relatively large angular range in order to produce a good light homogenization effect, because only in such situations the light beams can be reflected multiple times inside the integrator rod to be homogenized. However, through study the inventors of the instant invention gained deeper understanding of integrator rods, i.e., when applied in laser field, merely converging multiple laser beams to form an large angular range of input light does not work; rather, the divergence half-angle of each laser beam must be increased. As long as the divergence half-angle of each laser beam is sufficiently increased, even when the multiple laser beams are near parallel to each other, good homogenization effect can be achieved by the integrator rod.

However, when increasing the divergence half-angle of each laser beam, the rates of increase of the divergence angle for each laser beam in the direction of the long axis and in the direction of the short axis of the light distribution are approximately equal; thus, when entering the integrator rod, even though the divergence half-angle of each laser beam is increased, the divergence angle of each laser beam in the direction of the short axis is much smaller than the divergence angle in the direction of the long axis, so the number of reflections of the light beam inside the integrator rod for these two directions are also significantly different; as a result, the light spot formed by each secondary laser beam on the plane at the exit port of the integrator rod is mixed relatively uniformly in the direction of the long axis, while the uniformity in the direction of the short axis is relatively poor. Therefore, in this embodiment, by providing the angular distribution control element between the collimation optical element and the integrator rod, for each secondary laser beam entering the integrator rod, the ratio of the divergence angle in the direction of the short axis to the divergence angle in the direction of the long axis of the light distribution is greater than or equal to 0.7, so that the light homogenizing effect of each secondary laser beam in the direction of the short axis is improved.

In this embodiment, the angular distribution control element may also be a cylindrical lens array. The cylindrical lens array is arranged such that each cylindrical lens corresponds to at least one column of secondary laser beams, and the column direction of each such column of secondary laser beams is parallel to the generating line of the cylindrical lens. Further, in the at least one column of secondary light beams, the long axes of the light distribution of the secondary light beams are parallel to each other and parallel to the generating line of the cylindrical lens. Compared to using only one cylindrical lens, using a cylindrical lens array can increase the divergence angle in the direction of the short axis of the light distribution of each secondary laser beam by a larger amount, so that it is closer to the divergence angle in the direction of the long axis. However, using only one cylindrical lens is more convenient in fabrication.

In this embodiment, when the laser beams emitted by the laser elements themselves are already well collimated, the collimating lenses may be omitted. However, it should be noted that when the collimating lens array is omitted form the laser light source array, the directions of the long axis and short axis of each primary laser beam in the primary laser beam array are rotated by 90 degrees. Therefore, correspondingly, as compared to the above described embodiment, the positioning of the cylindrical lens should be rotated by 90 degrees in the plane perpendicular to the optical axis of the laser beam array.

Of course, in this embodiment, the angular distribution control element 35 does not have to be a cylindrical lens array; it may be a scattering plate, where the scattering plate scatters the secondary laser beam to larger angles in the direction of the short axis of the secondary laser beam than in the direction of the long axis, or it only scatters the secondary laser beam in the direction of the short axis, such that the ratio of the divergence angle in the direction of the short axis of the light distribution of the laser beam to the divergence angle in the direction of the long axis is greater than or equal to 0.7.

For example, the scattering structure on the surface of the scattering plate contains multiple closely packed micro-structures that are translucent, where each micro-structure is a cylindrical shape; further, the generating lines of the micro-structures are parallel to each other and are parallel to the direction of the long axis of the light distribution of the incident secondary laser beams. Or, translucent scattering structures shaped like cylinders or parts of cylinders may be mixed in a transparent substrate, where the scattering structures and the substrate have different refractive indices; further, the generating lines of the scattering structures are parallel or near parallel to each other and are parallel to the direction of the long axis of the light distribution of the incident secondary laser beams. Or, the scattering plate may be a diffraction optical element (DOE); by designing the phase of each point of the DOE, the DOE only increases the divergence angle in the direction of the short axis of the light distribution of the incident secondary laser beam, or increase the divergence angle in the direction of the short axis of the light distribution of the incident secondary laser beam more than in the direction of the long axis.

Figure 3D:
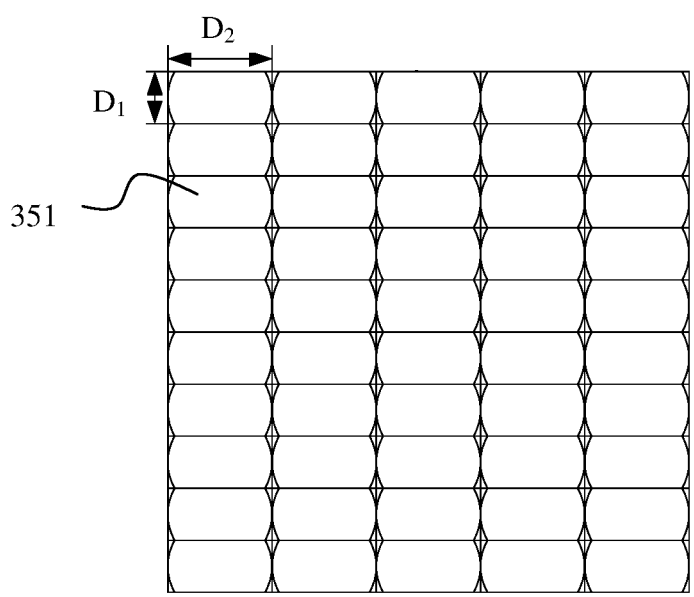
FIG. 3D schematically illustrates the structure of a microlens array in the laser light source according to an embodiment of the present invention.

In this embodiment, the angular distribution control element 35 may also be a micro-lens array, formed by joining together multiple rectangular lenses. Refer to FIG. 3D, which schematically illustrates the structure of a micro-lens array in the laser light source according to this embodiment. Each micro-lens 351 is a rectangle, the lengths of its two sides being $D_1$ and $D_2$ respectively, where $D_1$ is smaller than $D_2$. When a parallel light beam is incident on the micro-lens array, it forms a light beam having different divergence angles along the two sides of the rectangle, where the ratio of the divergence angle along the long side to that along the short side is approximately $D_2:D_1$. Therefore, for each secondary laser beam in the secondary laser beam array incident on the micro-lens array, the short axis of the light distribution may be made parallel to the long side of the micro-lenses, so that the increase of the divergence angle in the direction of the short axis of the light distribution of each secondary laser beam is more than that in the direction of the long axis. By designing the ratio of the two sides of the micro-lenses and the surface curvatures of the micro-lenses, the ratio of the divergence angle in the direction of the short axis of the light distribution of the output secondary laser beams from the micro-lens array to the divergence angle in the direction of the long axis is greater than or equal to 0.7.

In this embodiment, the angular distribution control element and the integrator rod may be formed integrally as one body. For example, the integrator rod may be a solid rod, and its entrance port may be formed into a cylindrical structure, or the entrance port may be provided with a scattering structure like the scattering plate.

In the above embodiment, the angular distribution control element 35 is located between the collimation optical element and the integrator rod. In practice, the angular distribution control element 35 may be located anywhere on the optical path between the laser light source array and the integrator rod; as long as for each laser beam of the laser beam array emitted by the laser light source array, the ratio of the divergence angle in the direction of the short axis of the light distribution to the divergence angle in the direction of the long axis is made greater than or equal to 0.7, the object of the present invention is achieved.

In this embodiment, the collimation optical element is a concave lens. In practice, the collimation optical element may also be a convex lens; as long as the focusing optical element 33 and that convex lens are confocal, the effect is the same as using a concave lens, except that the length of the system in the light propagation direction will increase, and the overall system will become slightly larger. More generally, the focusing optical element and the collimation optical element are not limited to the convex lens or concave lens in this embodiment; for example, the focusing optical element may use one or more reflecting mirrors to focus the multiple laser beams, and the collimation optical element may be a Fresnel lens; any suitable optical elements that can achieve the above-described functions are within the scope of this invention.

Second Embodiment

In the first embodiment, by providing an angular distribution control element between the laser light source array and the integrator rod, the ratio of the divergence angle in the direction of the short axis of each laser beam to the divergence angle in the direction of the long axis is increased. However, this can be achieved not by providing the angular distribution control element between the laser light source array and the integrator rod, but by using the collimating lens array of the laser light source array. In this embodiment, the collimating lens array functions as the angular distribution control element.

Figure 4:
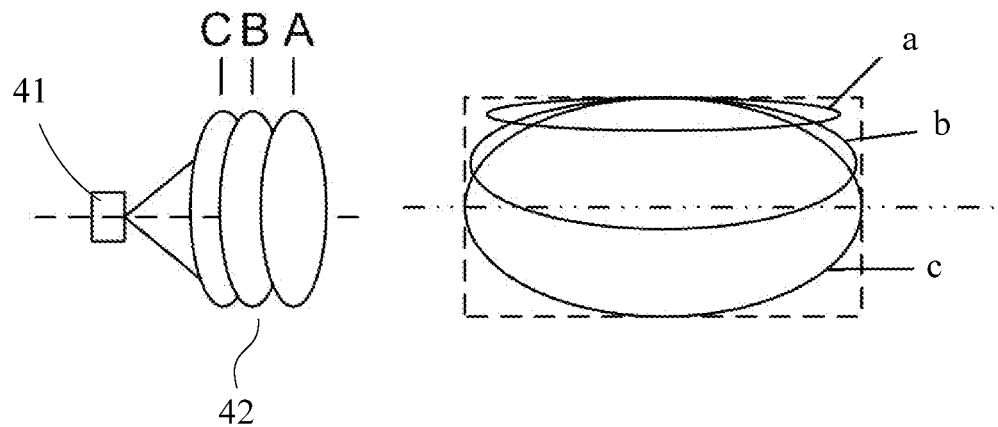
FIG. 4 schematically illustrates the situations when the laser element is located at or off the focal point of the collimating lens.

For clarity, the "aspect ratio" below refers to the ratio of the long axis to the short axis of an ellipse. Refer to FIG. 4, when the laser element 41 is located right at the focal point of the collimating lens 42, the collimating lens 42 is located at position A on the optical axis of the laser element, and the output laser beam of the collimating lens 42 is focused by a focusing lens (not shown in the figure) to form a light spot on the target plane which is a long and narrow ellipse a. When the laser element 41 is located on the optical axis of the collimating lens 42 but away from its focal point, for example when the collimating lens 42 located at position B which is closer to the laser element 41, the output laser beam of the collimating lens 42 is focused by the focusing lens to form a light spot on the target plane which is an ellipse b, where the aspect ratio of the ellipse b is smaller than the aspect ratio of the ellipse a. If the collimating lens 42 is located at a position C which is even closer to the laser element 41, the output laser beam of the collimating lens 42 is focused by the focusing lens to form a light spot on the target plane which is an ellipse c, where the aspect ratio of the ellipse c is smaller than the aspect ratio of the ellipse b.

Based on experiments and theoretical analyses, the inventors of the present invention discovered that: in the off-focus situation, for the light emitted by the laser element, the distance between the outer-most light in the direction of the long axis of the light distribution and the optical axis of the collimating lens increases faster by a few times than the distance between the outer-most light in the direction of the short axis and the optical axis. From FIG. 3B, it can be seen that the long axis of the light distribution of the light emitted by the laser element is parallel to the short side of the light emitting surface of the laser element, and the short axis of the light distribution is parallel to the long side of the light emitting surface of the laser element. Thus, in the light beam output from the collimating lens, the divergence angle in the direction parallel to the short side of the light emitting surface of the laser element increases much faster than the divergence angle in the direction parallel to the long side of the light emitting surface of the laser element.

From FIG. 3C, it can be seen that in the light beam outputted by the collimating lens, the direction parallel to the short side of the light emitting surface of the laser element is the direction of the short axis of the light distribution of the light beam, and the direction parallel to the long side of the light emitting surface of the laser element is the direction of the long axis of the light distribution of the light beam. Therefore, in the output light beam of the collimating lens, the divergence angle in the direction of the short axis of the light distribution increases faster by a few times than the divergence angle in the direction of the long axis. As a result, the short axis of the elliptical light spot on the target plane increases faster than the long axis, causing the aspect ratio of the elliptical light spot to change.

Thus, different from the first embodiment, in this embodiment, each laser element is located on the optical axis of the corresponding collimating lens but away from its focal point (referred to as off-focus below), and the degree of off-focus is such that for each primary laser beam output by the collimating lens, the ratio of the divergence angle in the direction of the short axis of the light distribution to the divergence angle in the direction of the long axis is greater than or equal to 0.7.

In the first embodiment, the scattering plate or the cylindrical lens, in particular the scattering plate, will cause some light loss. In this embodiment, by using the off-focus technique, the light loss is reduced and the efficiency is higher.

Preferably, the collimating lens is moved from the ideal position (i.e. the position where the laser element is located at the focal point of the collimating lens) toward the laser element, i.e., to make the distance between the laser element and the corresponding collimating lens less than the focal distance of the collimating lens; as a result the light collecting angle of the collimating lens is larger, and the light utilization efficiency is higher. The amount of off-focus should not be too large, to avoid too large a divergence angle of the output light beam of the collimating lens. Preferably, the distance between the position of the off-focus collimating lens and its ideal position is less than or equal to 0.05 mm.

In practice, the techniques of the first and second embodiments may be combined. I.e., in the laser light source array, each laser element is off-focus with respect to its corresponding collimating lens, and at the same time, an angular distribution control element is provided between the laser light source array and the integrator rod, so that for each laser beam that enters the integrator rod, the ratio of the divergence angle in the direction of the short axis of the light distribution to the divergence angle in the direction of the long axis is greater than or equal to 0.7.

Third Embodiment

In the above embodiments, the purpose of the invention is achieved by shaping the laser beams on the optical path before reaching the integrator rod. Alternatively, by designing the integrator rod, uniform light homogenization in two directions can be achieved by the integrator rod even for light beams where the ratio of the divergence angle in the direction of the short axis to that in the direction of the long axis is relatively small. This is explained below.

Figure 5:
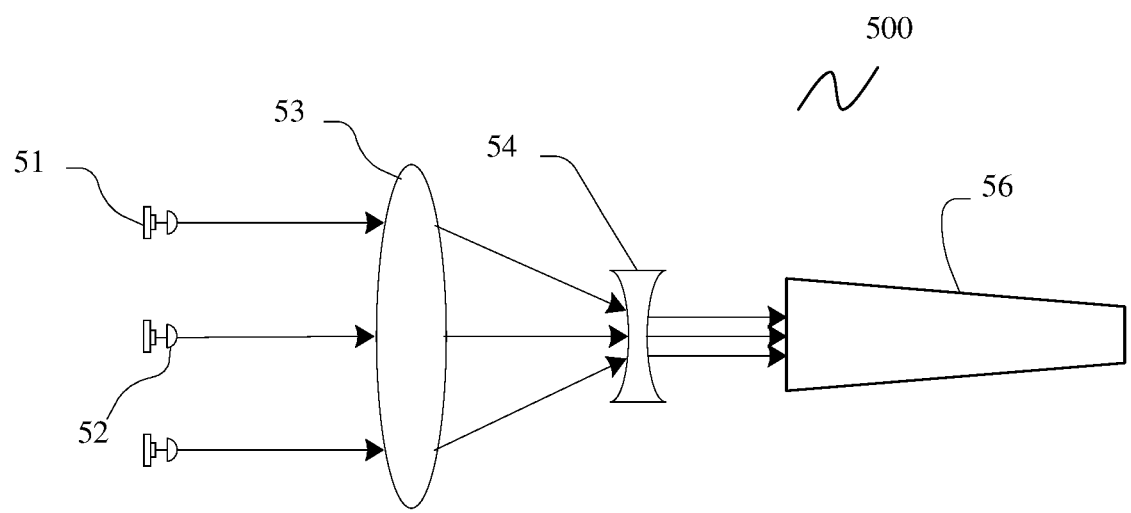
FIG. 5 schematically illustrates the structure of a laser light source according to another embodiment of the present invention.

Refer to FIG. 5, which schematically illustrates the structure of a laser light source according to another embodiment of the present invention. The laser light source 500 includes a laser light source array, a focusing optical element 53, a collimation optical element 54 and an integrator rod 56.

Differences between this embodiment and the earlier-described embodiments include:

In this embodiment, the laser light source array includes a laser element array 51 and a collimating lens array 52 which correspond one-to-one with each other, for generating a collimated primary laser beam array. The laser elements and the corresponding collimating lenses are not off-focus. Of course, when the laser beams emitted by the laser elements themselves are well collimated, the collimating lens array may be omitted.

The primary laser beam array is sequentially focused by the focusing optical element 53 and collimated by the collimation optical element 54 to form a secondary laser beam array, which is directly incident onto the integrator rod 56.

Figure 6:
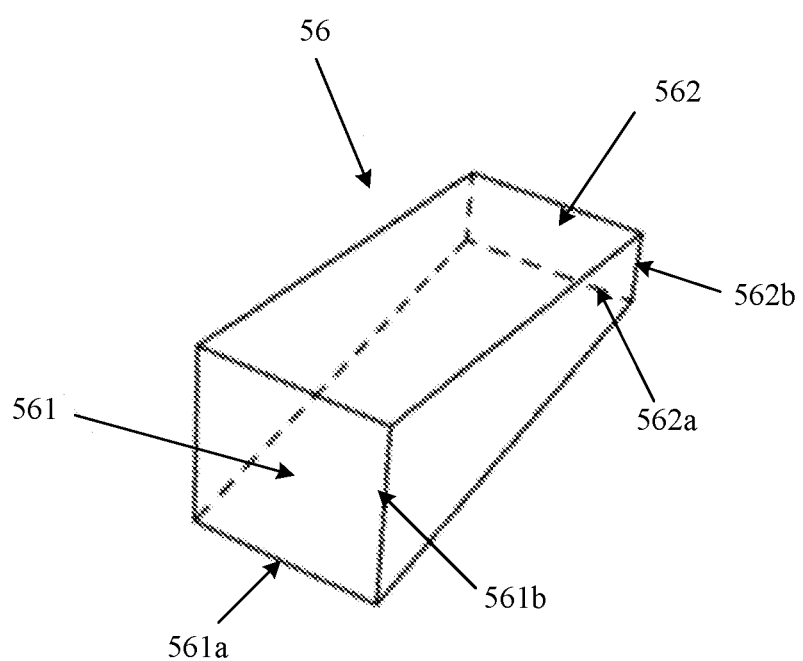
FIG. 6 is a perspective view of the integrator rod of the laser light source of FIG. 5.

Refer to FIG. 6, which is a perspective view of the integrator rod of the laser light source of FIG. 5. The light entrance port 561 of the integrator rod 56 is larger in size than the light exit port 562. In this embodiment, the light entrance port 561 and the light exit port 562 are both rectangles. Preferably, the ratio of the long side to the short side of the light exit port 562 is 16/9 or 4/3, to match the shape of the light valve of the light modulating device in the downstream optical path.

In this embodiment, the long side 561*a* of the light entrance port 561 is the first side, and the short side 561*b* is the second side. The long side 562*a* of the light exit port 562 is the first side, and the short side 562*b* is the second side. The long side 561*a* of the light entrance port is parallel to the long side 562*a* of the light exit port, and the length ratio of the first side 561*a* of the light entrance port to the first side 562*a* of the light exit port is smaller than the length ratio of the second side 561*b* of the light entrance port to the second side 562*b* of the light exit port.

When the secondary laser beam array is incident on the light entrance port 561 of the integrator rod 56, the direction of the long axis of each secondary laser beam is parallel to the first side 561*a* of the light entrance port 561; hence, the direction of the short axis of each secondary laser beam is parallel or near parallel to the short side 561*b* of the light entrance port 561. Because the length ratio of the first side 561*a* of the light entrance port to the first side 562*a* of the light exit port is smaller than the length ratio of the second side 561*b* of the light entrance port to the second side 562*b* of the light exit port, the light beams in the direction of the short axis of the laser beam are reflected more times inside the integrator rod than the light beams in the direction of the long axis. This improves the uniformity in the direction of the short axis of the secondary laser beam array after the light homogenization rod.

In this embodiment, the length ratio of the long side 561*a* of the light entrance port of the integrator rod to the long side 562*a* of the light exit port is preferably 1, to avoid increasing the divergence angle in the direction of the long axis of the light distribution of the secondary laser beams.

Preferably, the light entrance port 561 of the integrator rod is a square shape, so as to couple more secondary laser beams into the integrator rod.

In this embodiment, the angular distribution control element of the first embodiment and/or the off-focus technique of the second embodiments may be additionally used, to increase the ratio of the divergence angle in the direction of the short axis of the light distribution to the divergence angle in the direction of the long axis for each secondary laser beam of the secondary laser beam array that enters on the integrator rod. This in turn improves the uniformity of the laser beams after the integrator rod. It should be understood that, when using the integrator rod of this embodiment, if the angular distribution control element and/or the off-focus technique are also used to increase the ratio of the divergence angle in the direction of the short axis of the light distribution of the laser beam to the divergence angle in the direction of the long axis, the requirement on the ratio can be less strict than in the cases of the first and second embodiments; here the ratio may be less than 0.7, so long as it is larger than the corresponding ratio for the secondary laser beams of the secondary laser beam array entering the integrator rod when not using the angular distribution control element and/or the off-focus technique.

The various embodiments in this disclosure are described in a progressive manner, where each embodiment is described by emphasizing its differences from other embodiments. The common or similar features of the embodiments can be understood by referring to each other.

Another embodiment of the present invention provides a wavelength conversion light source, including a laser light source which may have the structures and functions of the laser light source described in the above embodiments, and a wavelength conversion device which receives the light generated by the laser light source and emits a converted light.

Another embodiment of the present invention provides a light combining light source, including a laser light source which may have the structures and functions of the laser light source described in the above embodiments, and a wavelength conversion light source. The wavelength conversion light source includes an excitation light source and a wavelength conversion device, which receives the excitation light generated by the excitation light source and emits a converted light. The light combining light source further includes a light combining device, where the light emitted by the laser light source and the converted light emitted by the wavelength conversion light source are incident onto the light combining device from different directions and are combined by the light combining device into one light beam to be output.

Another embodiment of the present invention provides a projection system, including the above light combining light source, and further including a spatial light modulator device, for receiving the light beam from the light combining light source and modulating it. The projection system may employ various projection technologies, such as liquid crystal display (LCD) projection technology, digital light processor (DLP) projection technology, etc. The above light combining light source can also be used in illumination systems, such as stage lighting.

The above descriptions disclose the embodiments of the present invention, but do not limit the scope of the invention. Thus, it is intended that the present invention cover modifications and variations that come within the scope of the appended claims and their equivalents, as well as direct or indirect applications of the embodiments in other related technical fields.

What is claimed is:

1. A laser light source, comprising:
    a laser light source array including a laser element array having a plurality of laser elements each emitting a light having a ratio of a divergence angle in a direction of a short axis of its light distribution to a divergence angle in a direction of a long axis of its light distribution, the laser light source array generating a primary laser beam array, wherein the primary laser beam array includes a plurality of primary laser beams that are parallel to each other;
    a first optical element and a second optical element disposed sequentially after the laser light source array, wherein the primary laser beam array sequentially passes through the first optical element to become convergent toward each other and pass through the second optical element to form a secondary laser beam array, wherein the secondary laser beam array includes a plurality of secondary laser beams that are parallel to each other, and wherein a distance between the secondary laser beams in the secondary laser beam array is smaller than a distance between the primary laser beams in the primary laser beam array;
    an integrator rod disposed after the second optical element, for receiving and homogenizing the secondary laser beam array; and
    an angular distribution control element disposed on an optical path between the laser element array and the integrator rod, for increasing, for each laser beam that pass through the angular distribution control element, a ratio of a divergence angle in a direction of a short axis of a light distribution of the laser beam to a divergence angle in a direction of a long axis of the light distribution of the laser beam, wherein a ratio of divergence angles of the secondary laser beam array that enters the integrator rod is greater than the ratio of the divergence angles of the light emitted by a corresponding one of the laser elements.

2. The laser light source of claim 1, wherein the angular distribution control element is a lens array, each lens of the lens array corresponding to a laser element of the laser element array; and
    wherein the laser element is located on an optical axis of the corresponding lens and away from its focal point, and wherein a laser beam output by the lens has a ratio of a divergence angle in a direction of a short axis of its light distribution to a divergence angle in a direction of a long axis which is greater than the ratio of the divergence angles of the light emitted by the corresponding laser element.

3. The laser light source of claim 2, wherein a distance between a location of the lens and a predefined position is less than or equal to 0.05 mm, wherein the predefined position of the lens is located at its focal point.

4. The laser light source of claim 1, wherein the angular distribution control element is at least one cylindrical lens, disposed between the second optical element and the integrator rod, wherein each cylindrical lens corresponds to at least one column of the secondary laser beams of the secondary laser beam array outputted by the second optical element, wherein a column direction of each column of the at least one column of secondary laser beams is parallel to a generating line of the cylindrical lens, and wherein for each secondary laser beam of each column of secondary laser beams, its long axis of the light distribution is parallel to the generating line of the cylindrical lens; and
    wherein for each secondary laser beam of each column of secondary laser beams after its corresponding cylindrical lens, the ratio of the divergence angle in the direction of the short axis of the light distribution to the divergence angle in the direction of the long axis is increased.

5. The laser light source of claim 1, wherein the angular distribution control element is a scattering plate, disposed between the second optical element and the integrator rod, wherein for each secondary laser beam in the secondary laser beam array after scattering by the scattering plate, the ratio of the divergence angle in the direction of the short axis of the light distribution to the divergence angle in the direction of the long axis is increased.

6. The laser light source of claim 1, wherein the angular distribution control element is a micro-lens array, disposed between the second optical element and the integrator rod, wherein each micro-lens in the micro-lens array is a rectangle;
    wherein a direction of a short axis of a light distribution of the secondary laser beam array incident on the micro-lens array is parallel to a long side of each micro-lens; and wherein for each secondary laser beam in the secondary laser beam array outputted from the micro-lens array, the ratio of the divergence angle in the direction of the short axis of the light distribution to the divergence angle in the direction of the long axis is increased.

7. The laser light source of claim 1, wherein the angular distribution control element is a diffraction optical element, disposed between the second optical element and the integrator rod, wherein for each secondary laser beam in the secondary laser beam array, after passing through the diffraction optical element, the ratio of the divergence angle in the direction of the short axis of the light distribution to the divergence angle in the direction of the long axis is increased.

8. The laser light source of claim 1, wherein the integrator rod is a solid rod, and wherein the angular distribution control element and the integrator rod are formed integrally as one body.

9. The laser light source of claim 1, wherein a light entrance port of the integrator rod is larger in size than a light exit port;
   wherein the light entrance port of the integrator rod has a first side and a second side perpendicular to each other, the light exit port has a first side and a second side perpendicular to each other, wherein the first side of the light entrance port and the first side of the light exit port are parallel to each other, and wherein a length ratio of the first side of the light entrance port to the first side of the light exit port is smaller than a length ratio of the second side of the light entrance port to the second side of the light exit port; and
   wherein when the secondary laser beam array enters the integrator rod, the direction of the long axis of the light distribution of each secondary laser beam is parallel to the first side of the light entrance port of the integrator rod.

10. The laser light source of claim 9, wherein the first side of the light entrance port of the integrator rod is equal in length to the first side of the light exit port.

11. The laser light source of claim 9, wherein the light entrance port of the integrator rod is a square shape.

12. The laser light source of claim 9, wherein the laser light source array further includes a lens array, wherein each lens of the lens array corresponds to a laser element, and wherein each laser element is located on an optical axis of the corresponding lens and away from its focal point, and wherein the angular distribution control element is located between the second optical element and the integrator rod.

13. A wavelength conversion light source, comprising:
   the laser light source of claim 1; and
   a wavelength conversion device, for receiving a light generated by the laser light source and emitting a converted light.

14. A light combining light source, comprising:
   the laser light source of claim 1;
   a wavelength conversion light source, which includes an excitation light source and a wavelength conversion device, the wavelength conversion device receiving an excitation light generated by the excitation light source and emitting a converted light; and
   a light combining device, where a light emitted by the laser light source and the converted light emitted by the wavelength conversion light source are incident onto the light combining device from different directions and are combined by the light combining device into one output light beam.

15. A projection system, comprising:
   the light combining light source of claim 14; and
   a spatial light modulator device, for receiving the output light beam generated by the light combining light source and modulating it.

* * * * *